Patented Sept. 6, 1932

1,875,689

UNITED STATES PATENT OFFICE

HERBERT LANGWELL, OF GREAT BURGH, ENGLAND, ASSIGNOR TO COMMERCIAL SOLVENTS CORPORATION, OF TERRE HAUTE, INDIANA, A CORPORATION OF MARYLAND

FERMENTATION OF CELLULOSIC MATERIAL

No Drawing. Application filed November 14, 1929. Serial No. 407,295.

My invention relates to a method of fermenting cellulosic materials for the production of acetic and butyric acids and other useful products. More particularly, my invention relates to the improvement which consists in carrying out such fermentations in a continuous manner. Other objects of the invention will appear from the discussion which follows.

In United States Patents Nos. 1,443,881, 1,602,306, and 1,639,571, Herbert Langwell has described methods of fermenting cellulosic materials by the aid of thermophilic bacteria which produce acetic and butyric acids, ethyl alcohol, and gases such as carbon dioxide, methane and hydrogen. According to the method described in these patents, a mash is prepared from some comminuted form of cellulosic material such as, for example, corncobs. This mash is then inoculated with a mixture of organisms capable of producing acetic and butyric acids and of the character ordinarily found in almost any form of fermenting vegetable matter, stable manure, pond mud, septic sewage, tank mud, soil, etc. These organisms are usually found in the intestinal tracts of cellulose-consuming animals, and accordingly a convenient form of inoculum is obtained by selecting material from the center of a steaming stable manure heap or from such other sources as is most convenient or suitable. The fermentation is then allowed to take place at temperatures in the neighborhood of 60° C.

Like all protoplasmic bodies bacteria consist of carbon, oxygen, hydrogen, and nitrogen, together with inorganic salts and varying quantities of phosphorus and sulphur. In order that bacteria may develop and multiply, therefore, they must be supplied with these substances in proper quantities and in suitable form for assimilation. The first three materials named are present in the cellulose used as the raw material. Certain of the other required materials are usually present in small but insufficient quantities with the raw material used as the source of the cellulosic material. These necessary nutrients are usually supplied in the form of varying proportions of such materials as potassium sulphate, sodium phosphate, ammonium chloride, ammonium sulphate, potassium chloride, slops from the butyl-acetonic fermentation process, "steep water", etc.

It has been found that, in general, bacteria which produce acids during the course of a fermentation become less and less active as the concentration of acid in the medium increases. After a certain point is reached the action of the bacteria becomes negligible unless the acid is removed from the medium. Such a condition is met with in the present case. Langwell, in the patents cited above, has recommended that the hydrogen ion concentration of the fermenting medium be maintained within the limits of about pH 5.0 to pH 9.0 measured in the bulk of the mash by the employment ($a$) of oxides, hydroxides, carbonates or bicarbonates of alkali metals including ammonium, or ($b$) oxides, hydroxides, carbonates, or bicarbonates of alkaline earth metals, including magnesium in which cases compounds of alkali metals which cause the formation of insoluble alkaline earth metal compounds are added from time to time. It is preferred to follow the procedure outlined under ($a$) in which case it is necessary to make small additions of the neutralizing agent at intervals thruout the course of the fermentation. Whatever method is resorted to, the mash should be agitated at frequent intervals or at least after each addition of neutralizing agent.

Naturally, the operating conditions employed in the fermentation of cellulosic materials may be varied in a number of ways with a consequent variation of the results obtained by the fermentation. For example, the fermentation may be carried out at temperatures varying between about 35° C. and about 70° C. with 60° C. as about the optimum. Changes in temperature affect principally the speed of the fermentation and the yields obtained thereby. Similarly, altho the fermentation can be carried out thru a fairly wide range of hydrogen ion concentration, optimum results are obtained when the mash is maintained close to the neutrality point. The results are further affected by the concentration and size of the cellulosic raw material employed. Another, and one of the principal factors affecting the fermentation is the method used for the inoculation. Thermophilic bacteria of the type employed to ferment cellulosic materials for the production of acetic and butyric acids and other useful products multiply at a much slower rate than is the case with many other types of bacteria, and hence fermentations carried out by the aid of such organisms require considerably longer periods of time for completion. This factor, particularly in commercial operations, is of the highest importance due to the greatly increased cost of the equipment required in case the fermentation is extended over a very long period of time, as well as the increased costs for the raw material being processed. The difficulties experienced in the case of such slow fermentations may, in general, be alleviated only by inoculating a charge of mash with an unusually large number of bacteria so that the period of time between inoculation and maximum fermentation is cut down as much as possible. This may be accomplished in several ways, but I have found that for a number of reasons better results are obtained by carrying out the fermentation continuously.

The continuous process of fermenting cellulosic materials may be modified slightly in a number of ways without either materially affecting the results obtained thereby or leaving the general concept of my invention, and it is naturally understood that my new process is intended to include and cover such obvious modifications. The procedure outlined below, therefore, should merely be regarded as an example of one of my preferred methods of operating.

*Example.*—100 gallons of a 4% concentration by weight of 30 mesh corncob meal was made up, using as the liquid portion of the medium, distillation slop obtained from the butyl-acetonic fermentation process. Instead of using this material, water might have been used and suitable inorganic salts or other materials, such as "steep water", added for the purpose of serving as the nutrient required for the proper growth and functioning of the organisms. Naturally, also other forms of cellulosic materials such as beet pulp, straw, etc., might be substituted for the corncob meal and different concentrations might be employed. The mash is then inoculated with a tested culture of thermophilic organisms producing acetic and butyric acids and other useful products and allowed to ferment at, preferably, about 60° C. Sufficient amounts or sodium bicarbonate, soda ash or other material of the character hereinabove specified is then added at daily or more frequent intervals so as to maintain the hydrogen ion concentration within the limits about $10^{-6}$ and $10^{-5}$ measured in the bulk of the mash, agitation of any convenient form being resorted to in order to keep the mash and added neutralizing agent suitably agitated.

If a sufficiently large amount of inoculum has been employed and other factors have been satisfactory the fermentation will near completion at about the end of the seventh day. Allowing the material to ferment for a longer time gives somewhat larger yields but not in proportion to the increased time. Hence, in commercial operation it is generally advisable at this point to start a new charge in the vessel. In following the usual procedure, however, the new charge will be subject to the same period of delay in reaching the maximum rate of fermentation as has just been described. My new process has for its objects the elimination of this comparatively non-productive period.

When the fermentation, as described above, has passed its peak it is desirable to obtain as quickly as possible a new charge of material in the same apparatus fermenting at approximately its optimum rate. I have found that this may be accomplished by leaving in the fermenter an appreciable amount of mash to serve as the inoculum for the new charge. This amount, of course, may vary considerably depending upon the particular operating conditions being employed, but I prefer to allow from 10% to 30% of the fermented material to remain in the vat and add to it from 90% to 70% of fresh mash which may be of the same or of different concentration. The procedure followed may also be modified somewhat without leaving the concept of my invention. For example, the desired proportion of mash may be withdrawn immediately, when it is noted that the fermentation has reached the proper stage. Or, as an alternate procedure which has some advantages, the agitator may first be stopped and the unfermented material allowed to settle as much as possible before drawing off the fermented material. As a rule, it will be found that the greater portion of the settling will have taken place in about 4 hours. In this way about two-thirds of fermented liquor containing relatively little unfermented liquor may be drawn off. Such a procedure assists materially in the succeeding steps involving the recovery of the products from the mash and at the same time leaves in the fermenter a greater amount of unfermented raw material as well as a larger number of bacteria since generally the greater proportion of the latter became attached to solid matter.

The results shown in the table below have been obtained by carrying out such a fermentation on a semi-continuous scale, using 100 gallons of mash. At the end of each five to seven day intervals, 90 gallons of fermented mash were withdrawn and an equal amount of fresh mash added and the operation of neutralizing, agitating, etc. continued just as in each preceding fermentation.

| No. | Time of fermentation (days) | Raw material | Concentration G/100 ml. | Added nutrient | Vol. acid as acetic % cob |
|---|---|---|---|---|---|
| 1 | 7 | 30 mesh corncob meal | 7 | By slop | 32.0 |
| 2 | 7 | do | 7 | do | 33.0 |
| 3 | 7 | do | 7 | do | 31.6 |
| 4 | 7 | do | 7 | do | 35.3 |
| 5 | 7 | do | 7 | do | 29.4 |
| 6 | 4 | do | 7 | do | 21.98 |
| 7 | 5 | do | 7 | do | 25.5 |
| 8 | 7 | do | 7 | do | 36.4 |
| 9 | 7 | do | 7 | do | 29.7 |
| 10 | 7 | Fine meal | 7 | do | 43.8 |
| 11 | 7 | do | 7 | do | 33.98 |
| 12 | 7 | do | 7.1 | do | 30.00 |
| 13 | 7 | do | 6.75 | do | 28.20 |
| 14 | 7 | do | 6.83 | do | 31.92 |
| 15 | 7 | do | 6.83 | do | 34.87 |
| 16 | 7 | do | 6.73 | do | 35.5 |
| 17 | 7 | do | 5.90 | do | 36.9 |
| 18 | 7 | do | 7.20 | do | 30.8 |
| 19 | 7 | do | 7.30 | do | 28.9 |
| 20 | 7 | do | 7.40 | do | 27.8 |

In addition to the advantages afforded in the way of increased yields in a given period of time my new continuous process of fermenting cellulosic materials has certain other advantages of at least equal importance. For example, by using as the inoculum, material remaining in the fermenter from a previous fermentation, the necessity of building up the required volume of inoculum in a series of auxiliary vessels is obviated. Of still greater importance is the fact that by my new system an adequate source of tested inoculum is continually available.

Now having described my invention, what I claim as new and novel is:

1. In the process of producing acetic and butyric acids and other useful products by the fermentation of cellulosic materials by the aid of thermophilic bacteria, the steps which comprise inoculating a cellulosic mash with bacteria of the said type, allowing fermentation to go substantially to completion, allowing the mash to settle, withdrawing from the fermentation vessel a portion of the supernatant mash, adding to said fermentation vessel fresh cellulosic mash, and allowing the fermentation to continue.

2. A semi-continuous process for the fermentation of cellulosic materials in a single fermentation vessel which comprises inoculating a cellulosic mash with bacteria of the thermophilic type, allowing fermentation to go substantially to completion, allowing the mash to settle, withdrawing from the fermentation vessel a portion of the supernatant mash, adding to said fermentation vessel fresh cellulosic mash, and allowing the fermentation to continue.

In testimony whereof I affix my signature.

HERBERT LANGWELL.